United States Patent
Vivanco et al.

(10) Patent No.: US 9,253,681 B1
(45) Date of Patent: Feb. 2, 2016

(54) PHYSICAL RESOURCE BLOCK ALLOCATION FOR TTI BUNDLING

(71) Applicant: Sprint Spectrum L.P., Overland Park, KS (US)

(72) Inventors: Daniel Vivanco, Sterling, VA (US); Chunmei Liu, Great Falls, VA (US); Hemanth Pawar, Brambleton, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 38 days.

(21) Appl. No.: 14/308,518

(22) Filed: Jun. 18, 2014

(51) Int. Cl.
*H04W 72/04* (2009.01)
*H04W 28/02* (2009.01)

(52) U.S. Cl.
CPC .......... *H04W 28/0273* (2013.01); *H04W 72/04* (2013.01); *H04W 72/044* (2013.01)

(58) Field of Classification Search
CPC . H04W 72/048; H04W 72/087; H04W 72/08; H04W 72/0493; H04W 72/044; H04W 72/0406; H04W 72/04
USPC .................................................. 370/230–329
See application file for complete search history.

(56) References Cited

U.S. PATENT DOCUMENTS

| | | | | |
|---|---|---|---|---|
| 7,764,965 B2 * | 7/2010 | Bartlett | ................... | H04L 69/04 382/232 |
| 2005/0013246 A1 * | 1/2005 | Miyake | ................. | H04L 1/0002 370/230 |
| 2009/0232073 A1 * | 9/2009 | Yan | ..................... | H04W 72/085 370/329 |
| 2009/0257408 A1 * | 10/2009 | Zhang | ................... | H04L 1/1621 370/336 |
| 2009/0268707 A1 * | 10/2009 | Pani | ......................... | H04L 1/18 370/345 |
| 2010/0042884 A1 * | 2/2010 | Kuo | ...................... | H04W 52/48 714/748 |
| 2011/0305140 A1 | 12/2011 | Wang et al. | | |
| 2012/0147830 A1 * | 6/2012 | Lohr | .................. | H04W 72/042 370/329 |
| 2013/0250853 A1 | 9/2013 | Eravelli et al. | | |
| 2013/0250924 A1 | 9/2013 | Chen et al. | | |

OTHER PUBLICATIONS

Allman et al., "TCP Congestion Control", Network Working Group, Request for Comments 5681, Sep. 2009.

* cited by examiner

*Primary Examiner* — Afsar M Qureshi

(57) ABSTRACT

A wireless network receives one or more data segments transmitted by a wireless communication device (WCD) in or more transmission time intervals (TTIs), estimates a size of a next data segment to be transmitted by the WCD based at least in part on sizes of the one or more data segments transmitted by the WCD, and allocates a quantity of uplink resources (e.g., a number of physical resource blocks) to the WCD for use in one or more subsequent TTIs (e.g., TTIs used for TTI bundling) based at least in part on the estimated size of the next data segment. The network may refer to an algorithm, such as a Transmission Control Protocol (TCP) congestion control algorithm, that specifies how sizes of successive data segments increase over time to predict the size of the next data segment based on the sizes of the one or more data segments.

20 Claims, 8 Drawing Sheets

US 9,253,681 B1

PHYSICAL RESOURCE BLOCK ALLOCATION FOR TTI BUNDLING

BACKGROUND

In some wireless communication systems, when data that is transmitted by a transmitting entity to a receiving entity is not received by the receiving entity, or is received by the receiving entity with one or more errors, the data may be re-transmitted. The re-transmission of data could occur either automatically or in response to feedback from the receiving entity. For example, in Long Term Evolution (LTE) air interfaces, a Hybrid Automatic Repeat Request (HARQ) procedure is used. In the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting entity receives a NACK response from the receiving entity and another period of delay between when the transmitting entity receives the NACK response and when the transmitting entity begins re-transmitting the data.

In order to reduce the delay associated with re-transmitting data, LTE supports a bundling option for data transmissions by a wireless communication device (WCD) device in the Physical Uplink Shared Channel (PUSCH). Normally, a WCD transmits data in one transmission time interval (TTI), which corresponds to a 1 millisecond (ms) subframe, and then waits to receive a HARQ response before re-transmitting the data or transmitting additional data. However, when TTI bundling is used, the WCD device transmits the same data four times in four consecutive TTIs and then waits to receive a HARQ response. In this way, the WCD can transmit four instances of the same data, which allows for more robust reception of the data, but without the delay that would be associated with the WCD transmitting the data four times and waiting for a HARQ response after each transmission.

Overview

To facilitate efficient usage of air interface resources, a wireless network may allocate a quantity of uplink or downlink resources (e.g., a number of physical resource blocks) based on an estimated size of a data segment to be transmitted over the uplink or downlink. The size of the data segment to be transmitted over the uplink or downlink could be estimated based on (i) the sizes of one or more data segments that were previously transmitted over the uplink or downlink and (ii) an algorithm that specifies how sizes of successive data segments increase over time. The algorithm could be, for example, a Transmission Control Protocol (TCP) congestion control algorithm. Once the wireless network has estimated the size of the data segment to be transmitted, the network could determine, M, as the minimum number of physical resource blocks sufficient to transmit the data segment, and could allocate N physical resource blocks to transmit the data segment, where N is determined based on M. For example, N could be equal to M in some circumstances. In other circumstances, such as when the load on the uplink or downlink is threshold high, N could be less than M. The process of estimating the size of the data segment, determining M based on the estimated size of the data segment, and determining N based on M could be triggered by the wireless network determining that TTI bundling is warranted for a wireless communication device (WCD) that is using TCP to transmit data.

Example embodiments provide a method that involves: (a) receiving, by a base station in a wireless network, one or more data segments transmitted by a wireless communication device (WCD) in one or more transmission time intervals (TTIs); (b) estimating, by the wireless network, a size of a next data segment to be transmitted by the WCD based at least in part on sizes of one or more data segments transmitted by the WCD; (c) allocating, by the wireless network, a quantity of uplink resources to the WCD for use by the WCD in one or more subsequent TTIs, based at least in part on the estimated size of the next data segment; and (d) transmitting, by the base station, an indication to the WCD of the quantity of uplink resources allocated to the WCD.

Example embodiments also provide a wireless network. The wireless network comprises a base station and a controller. The controller comprises: one or more processors; data storage; and program instructions stored in the data storage and executable by the one or more processors to cause the controller to perform functions. The functions comprise: (a) receiving, via the base station, one or more data segments transmitted by a WCD in one or more TTIs; (b) estimating a size of a next data segment to be transmitted by the WCD based at least in part on sizes of the one or more data segments transmitted by the WCD; (c) allocating a quantity of uplink resources to the WCD for use by the WCD in one or more subsequent TTIs, based at least in part on the estimated size of the next data segment; and (d) causing the base station to transmit an indication to the WCD of the quantity of uplink resources allocated to the WCD.

DETAILED DESCRIPTION OF EXAMPLE EMBODIMENTS

1. Introduction

TTI bundling is most commonly used for transmitting voice data, which is associated with a relatively small packet size and a relatively low data rate. As a result, current standards allow for only a small quantity of uplink resources (no more than 3 physical resource blocks per TTI) to be allocated to a WCD using TTI bundling. In some cases, however, a WCD using TTI bundling may be engaged in a data service (e.g., file sharing) that can result in relative large packet sizes. In such cases, the maximum of 3 physical resource blocks per TTI may be insufficient to transmit an entire data packet in one TTI, thereby limiting the benefits of TTI bundling.

To address such limitations, a more flexible approach can be used to allocate uplink resources to a WCD using TTI bundling. In an example, the wireless network may estimate a size of a next data segment to be transmitted by a WCD based on the sizes of one or more data segments previously transmitted by the WCD. The wireless network can then determine the quantity of uplink resources (e.g., number of physical resource blocks) that is minimally sufficient to transmit the next data segment. The wireless network may allocate that minimally sufficient quantity of uplink resources to the WCD, provided that the uplink load of the base station serving the WCD is not relatively high. If the base station's uplink load is relatively high (e.g., higher than a predetermined threshold), the wireless network may allocate somewhat less than the minimally sufficient quantity of uplink resources to the WCD in order to conserve the base station's uplink resources.

Figure 3:
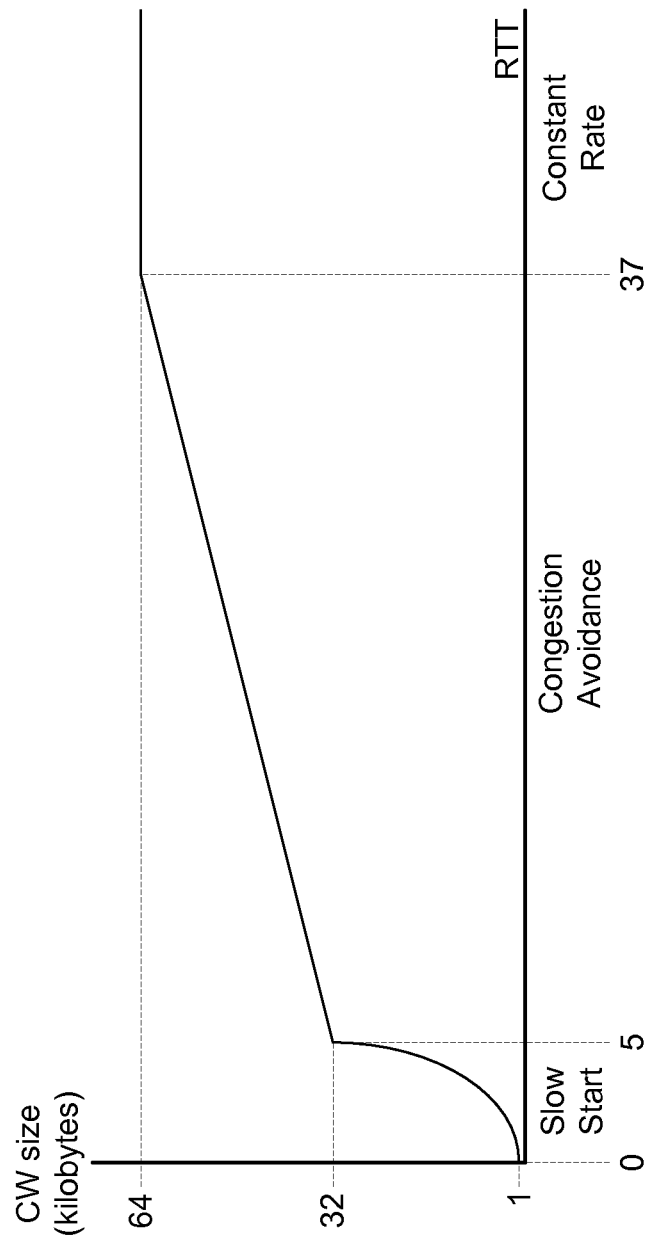
FIG. 3 is a graph showing a variation of a congestion window (CW) size as a function of round trip time (RTT), in accordance with an example embodiment.

This flexible approach can be used, for example, when the WCD is using the Transmission Control Protocol (TCP) to transmit data. TCP uses a congestion control algorithm that specifies how the sizes of successive data segments (e.g., data packets) can increase over time. FIG. 3 is a graph that illustrates aspects of the TCP congestion control algorithm. In FIG. 3, the vertical axis represents the size of a Congestion Window (CW) in kilobytes and the horizontal axis represents time in terms of round trip times (RTT). The CW is the maximum allowed size of a data segment that can be transmitted by a transmitter (e.g., a WCD). Each RTT represents an instance in which the transmitter transmits a data segment and receives an acknowledgement (ACK) that the data segment has been successfully received. The graph in FIG. 3 shows how the CW or maximum allowed size of data segment increases as a function of RTT. The increase occurs in three stages: (1) a slow-start stage, during which the CW increases from 1 kilobyte at RTT=0 to a "slow start threshold" of 32 kilobytes at RTT=5; (2) a congestion-avoidance stage, during which the CW increases from 32 kilobytes to 64 kilobytes; and (3) a constant-rate stage, during which the CW stays constant at 64 kilobytes. During the slow-start stage, the size of the CW grows exponentially by doubling after each RTT. During the congestion-avoidance stage, the size of the CW grows linearly by increasing by 1 kilobyte after each RTT. During the constant-rate phase, the size of the CW remains constant at 64 kilobytes after each RTT.

CW size is communicated between source and receiver during TCP transmission (the TCP header of a data segment contains a CW field). This is to allow the TCP receiver to allocate enough buffer resources for incoming TCP data segments.

This well-defined increased in the size of the CW as a function of RTT allows the wireless network to estimate the size of the next data segment to be transmitted by a WCD based on the size of the WCD's most-recently transmitted data segment, with the assumption that the WCD transmits data segments that have the largest sizes allowed by the CW. For example, if the WCD's most-recently transmitted data segment is less than 32 kilobytes, indicating the slow-start stage, then the next data segment can be predicted to be twice as large as the most-recently transmitted data segment. On the other hand, if the WCD's most-recently transmitted data segment is greater than 32 kilobytes and less than 64 kilobytes, indicating the congestion-avoidance stage, then the next data segment can be predicted to be 1 kilobyte larger than the most-recently transmitted data segment.

By allocating a quantity of uplink resources to a WCD that is minimally sufficient for the WCD to transmit its next data segment (or somewhat less than minimally sufficient), the benefits of TTI bundling can be extended to data services other than voice communication.

2. Example Communication System

Figure 1:
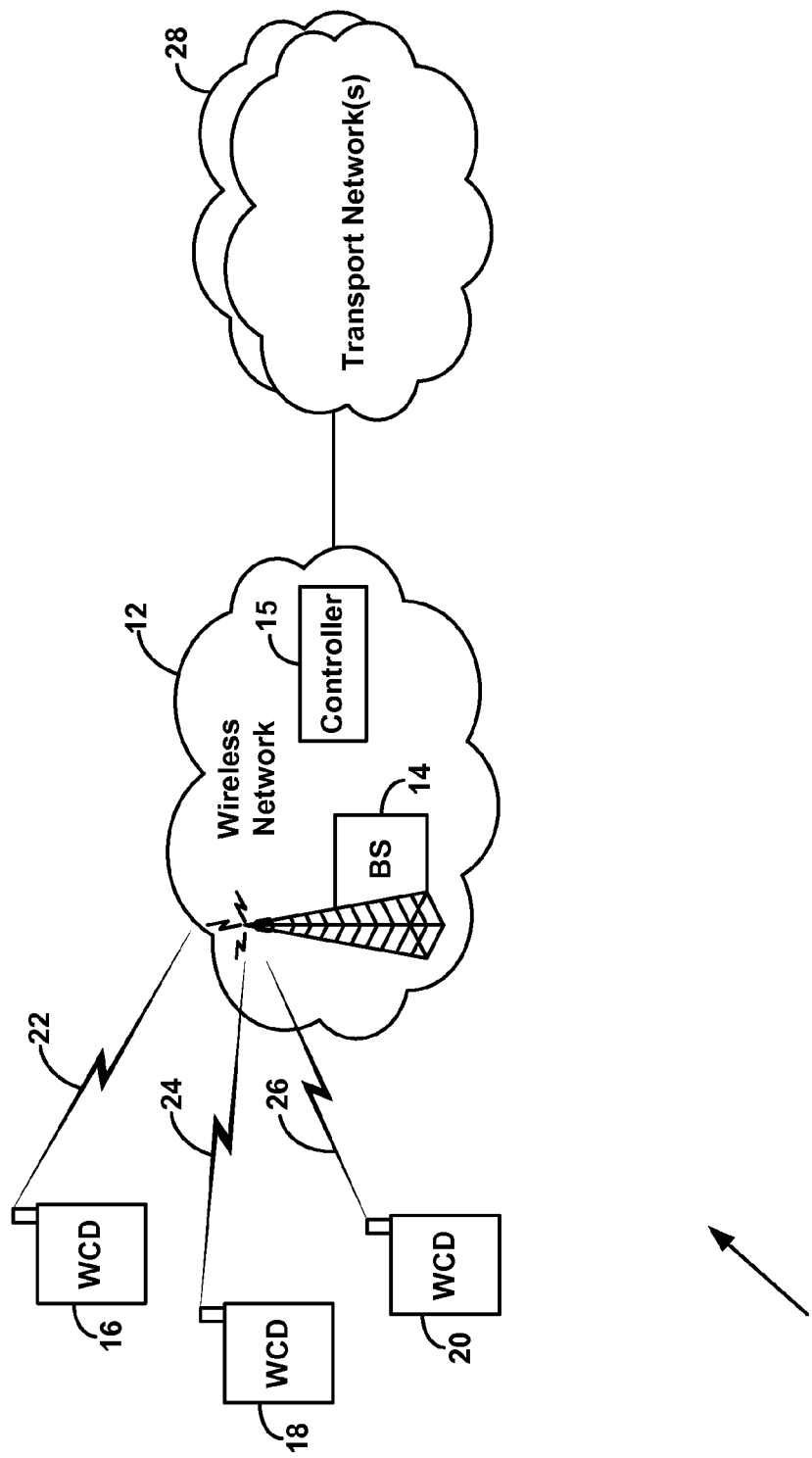
FIG. 1 is a block diagram of a communication system, in accordance with an example embodiment.

FIG. 1 is a block diagram of a communication system 10 in which exemplary embodiments may be employed. Communication system 10 includes a wireless network 12 that includes one or more entities that can communicate over an air interface, as exemplified by base station (BS) 14. Wireless network 12 could also include one or more control entities, such as a base station controller (BSC) or radio network controller (RNC), exemplified in FIG. 1 by controller 15. BS 14 could be, for example, a base transceiver station, a wireless access point, an access node, a Node-B, or an eNodeB. Although FIG. 1 shows only one base station in wireless network 12, it is to be understood that wireless network 12 could include any number of base stations.

BS 14 radiates to define one or more wireless coverage areas within which BS 14 can wirelessly communicate with WCDs. The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with WCDs 16, 18, and 20 via respective air interfaces 22, 24, and 26. WCDs 16, 18, and 20 could be wireless telephones, wireless handheld, tablet, or laptop computers, or other types of wireless communication devices. Although FIG. 1 shows BS 14 in wireless communication with three WCDs, it is to be understood that BS 14 could be in wireless communication with a greater or fewer number of WCDs. In addition, the number of WCDs in wireless communication with BS 14 can change over time, for example, as a result of one or more WCDs moving into or out of the wireless coverage area of BS 14 and/or as a result of one or more WCDs beginning or ending communication sessions.

Air interfaces 22, 24, and 26 could each include a respective uplink for communications from a WCD to BS 14 and a respective downlink for communications from BS 14 to a WCD. For purposes of illustration, the communications over air interfaces 22, 24, and 26 will be described herein with respect to the LTE protocol. It is to be understood, however, that other wireless communication protocols could be used.

Wireless network 12 may provide access to one or more transport networks 28, which could include, for example, the public switched telephone network (PSTN) and/or the Internet or other packet-switched networks. With this arrangement, a WCD being served by BS 14 may engage in a communication session, via wireless network 12, with an endpoint connected to one of transport networks 28. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

When a WCD, such as WCD 16, 18, or 20, is involved in a communication session, the WCD may transmit data over an uplink channel to BS 14 and may receive data from BS 14 over a downlink channel. In some cases, the communication session could be one that involves a user of the WCD, such as a voice communication application or Web browsing application. In other cases, the communication session could involve a background task, such as periodically registering with wireless network 12. In some implementations, WCDs 16, 18, and 20 may transmit data to BS 14 over an uplink shared channel. The usage of the uplink shared channel may be controlled by BS 14, by controller 15, or by some other entity in wireless network 12.

Figure 2A:
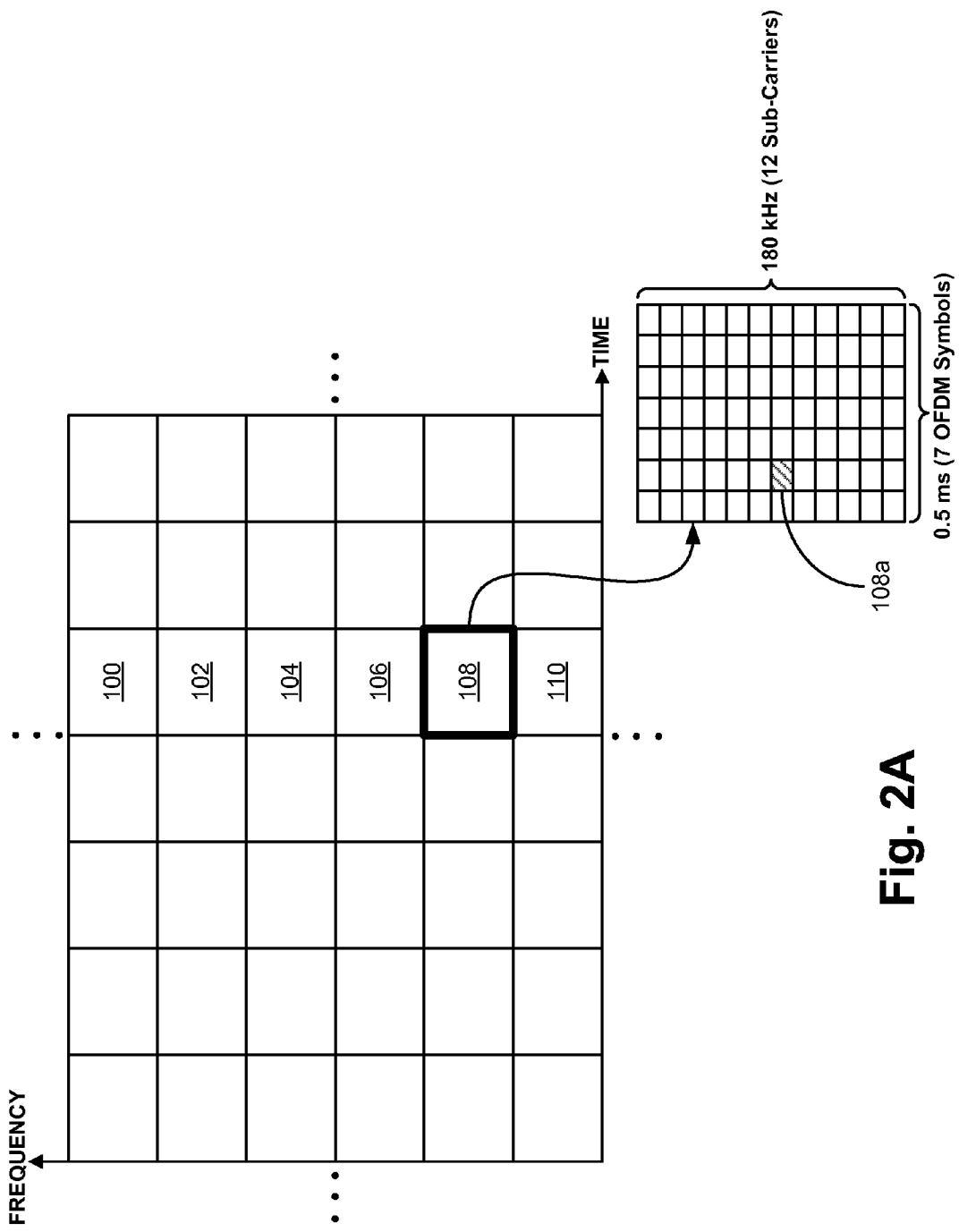
FIG. 2A is a conceptual illustration of a division of uplink resources into resource blocks, in accordance with an example embodiment.

For example, the LTE protocol defines a Physical Uplink Shared Channel (PUSCH) that WCDs can use to transmit data to a base station and a Physical Downlink Shard Channel (PDSCH) that the base station can used to transmit data to the WCDs. Portions of the PUSCH and the PDSCH may be allocated to particular WCDs by allocating physical resource blocks (PRBs). FIG. 2A illustrates how the uplink resources and the downlink resources in a given wireless coverage area may be divided in time and frequency domains into PRBs. In an LTE air interface, data is transmitted on both the uplink and the downlink in the form of orthogonal frequency division multiplexing (OFDM) symbols. Each OFDM symbol is formed from a plurality of sub-carriers, typically 12 sub-carriers, each with a bandwidth of 15 kHz. Thus, a PRB corresponds to a plurality of sub-carriers that are used to form an OFDM symbol and has a duration that can accommodate a particular number of OFDM symbols.

In the time domain, each PRB typically occupies a 0.5 ms slot of time. By way of example, FIG. 2A shows PRBs 100-110 for a particular slot. In the frequency domain, each of PRBs 100-110 occupies a respective portion of frequency bandwidth, typically 180 kHz in LTE implementations. Although FIG. 2A shows six PRBs in each slot, a wireless coverage area could have a greater number of PRBs, as indicated by the dots above and below resource blocks 100-110.

FIG. 2A also includes a more detailed view of PRB 108. This detailed view shows that the 180 kHz of frequency bandwidth corresponds to 12 sub-carriers of 15 kHz each. Further, in this example, the 0.5 ms slot of time corresponds to the duration of seven OFDM symbols. In other examples, a 0.5 ms slot could correspond to a different number of OFDM symbols. Thus, a PRB may be described as a set of resource elements, with each resource element corresponding to one modulated sub-carrier in an OFDM symbol. The detailed view of PRB 108 in FIG. 2A shows the division of the PRB into multiple resource elements, such as resource element 108a.

One or more PRBs may be allocated to a particular WCD to transmit data in the uplink shared channel (PUSCH). For example, PRBs 100 and 102 might be allocated to WCD 16, PRBs 104-108 might be allocated to WCD 18, and PRB 110 might be allocated to WCD 20. The allocation of PRBs to WCDs could be made by BS 14, by controller 15, or by some other entity in wireless network 12. Similarly, one or more PRBs could be allocated to a particular WCD to receive data that is transmitted by the base station in the downlink shared channel (PDSCH).

Figure 2B:
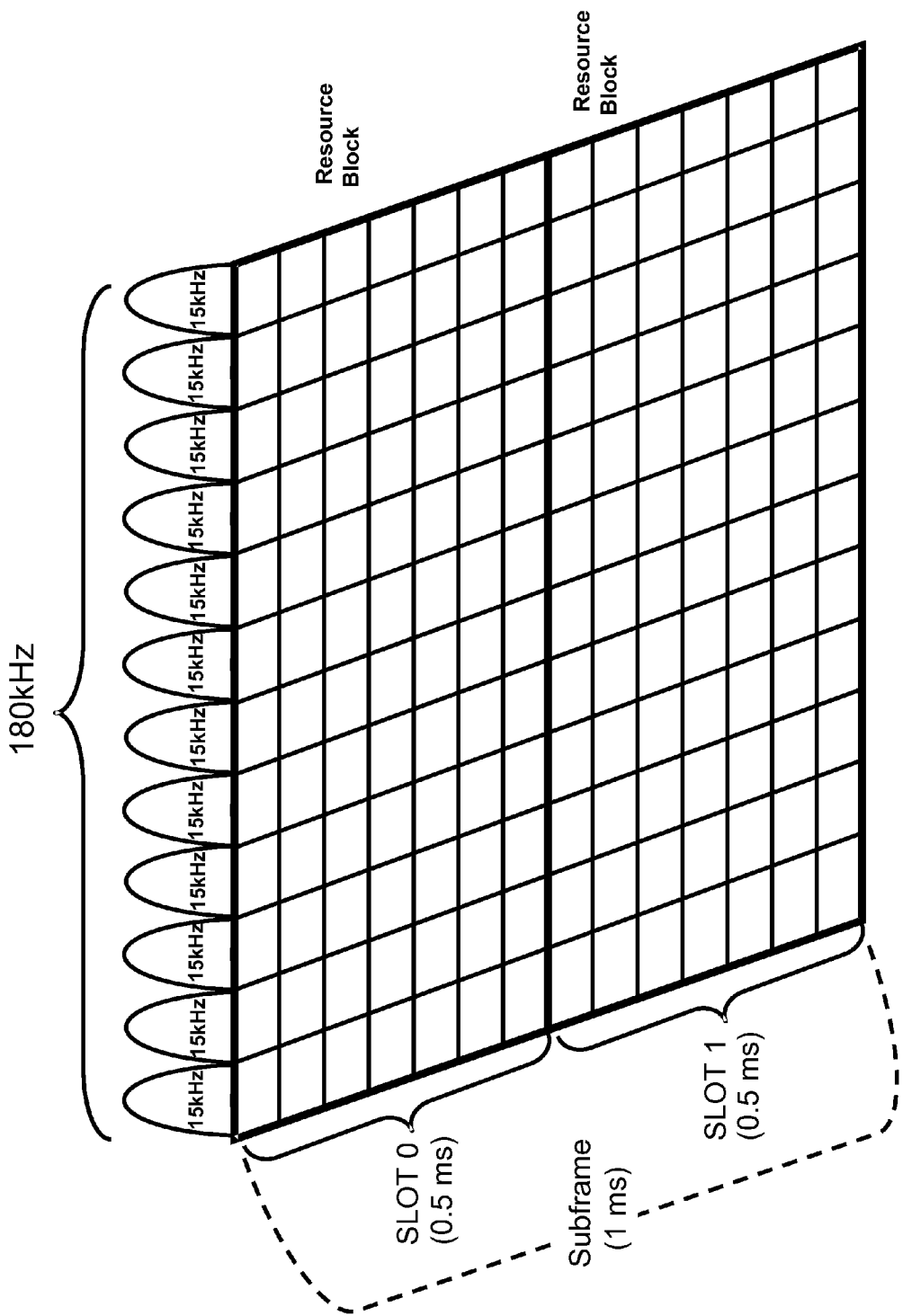
FIG. 2B is a conceptual illustration of two time-consecutive resource blocks, in accordance with an example embodiment.

FIG. 2B illustrates an uplink resource allocation for a WCD that is maintained for two consecutive slots of time (Slot 0 and Slot 1) in a given subframe (a downlink resource allocation may be similar). The two consecutive slots of time are treated as a transmission time interval (TTI) for purposes of LTE's HARQ process. In particular, after a WCD has transmitted its data in a TTI, such as shown in FIG. 2B, the WCD waits to receive a HARQ response from the RAN to determine whether the data should be re-transmitted or whether the WCD can transmit additional data. If the HARQ response is an ACK, indicating that the data was successfully received, then the WCD can transmit additional data. If the HARQ response is a NACK, indicating that the data was received with one or more errors, then the WCD re-transmits the data. The WCD may also re-transmit the data if the WCD does not receive a HARQ response within a predetermined period of time.

On the other hand, if a WCD has been instructed to use TTI bundling, then the WCD may transmit the same data in multiple TTIs before waiting for a HARQ response. The WCD may be allocated the same number of PRBs in each of these multiple TTIs.

3. Example Methods

Figure 4:
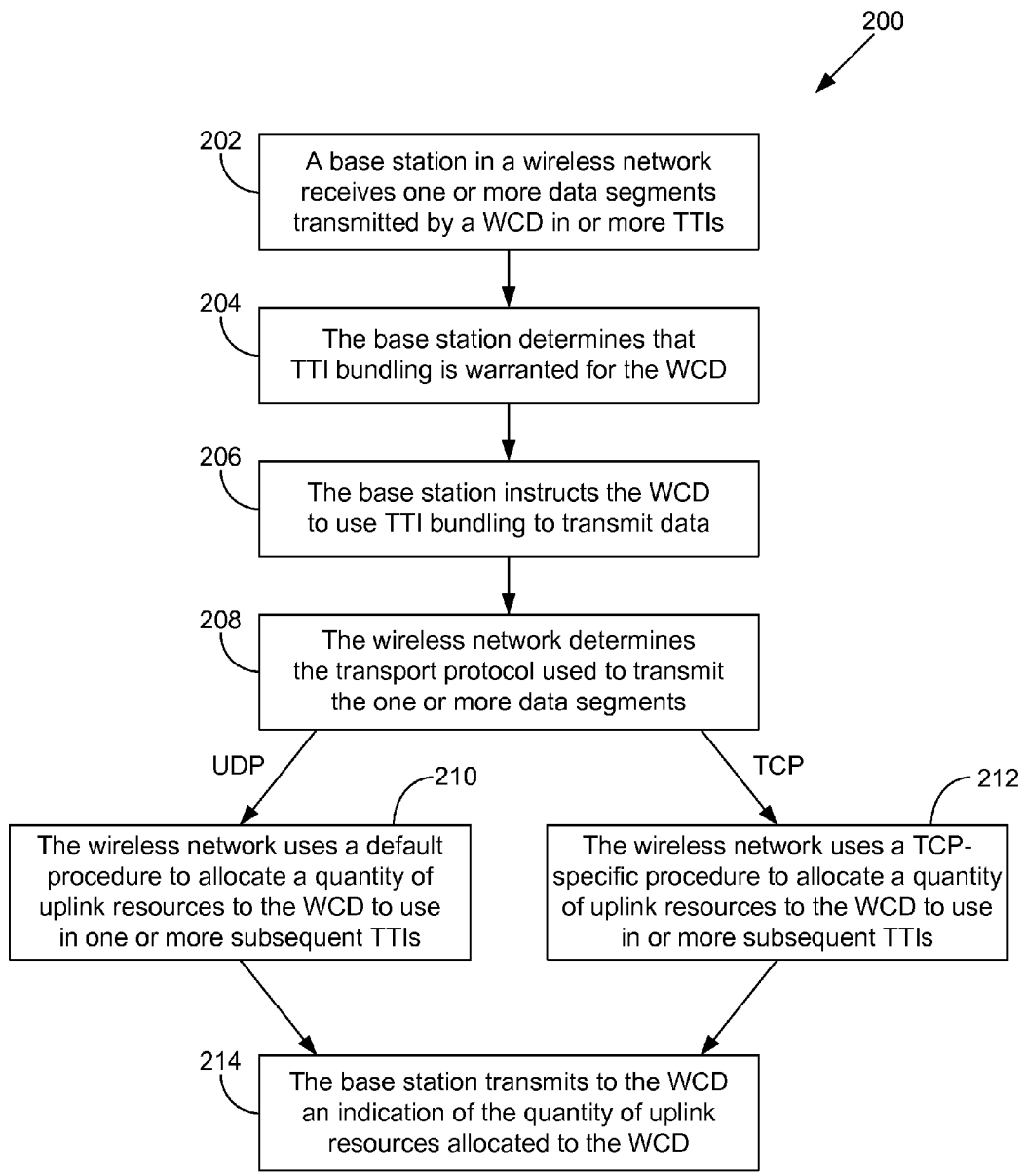
FIG. 4 is a flowchart of a method for allocating a quantity of uplink resources to a WCD, in accordance with an example embodiment.
Figure 5:
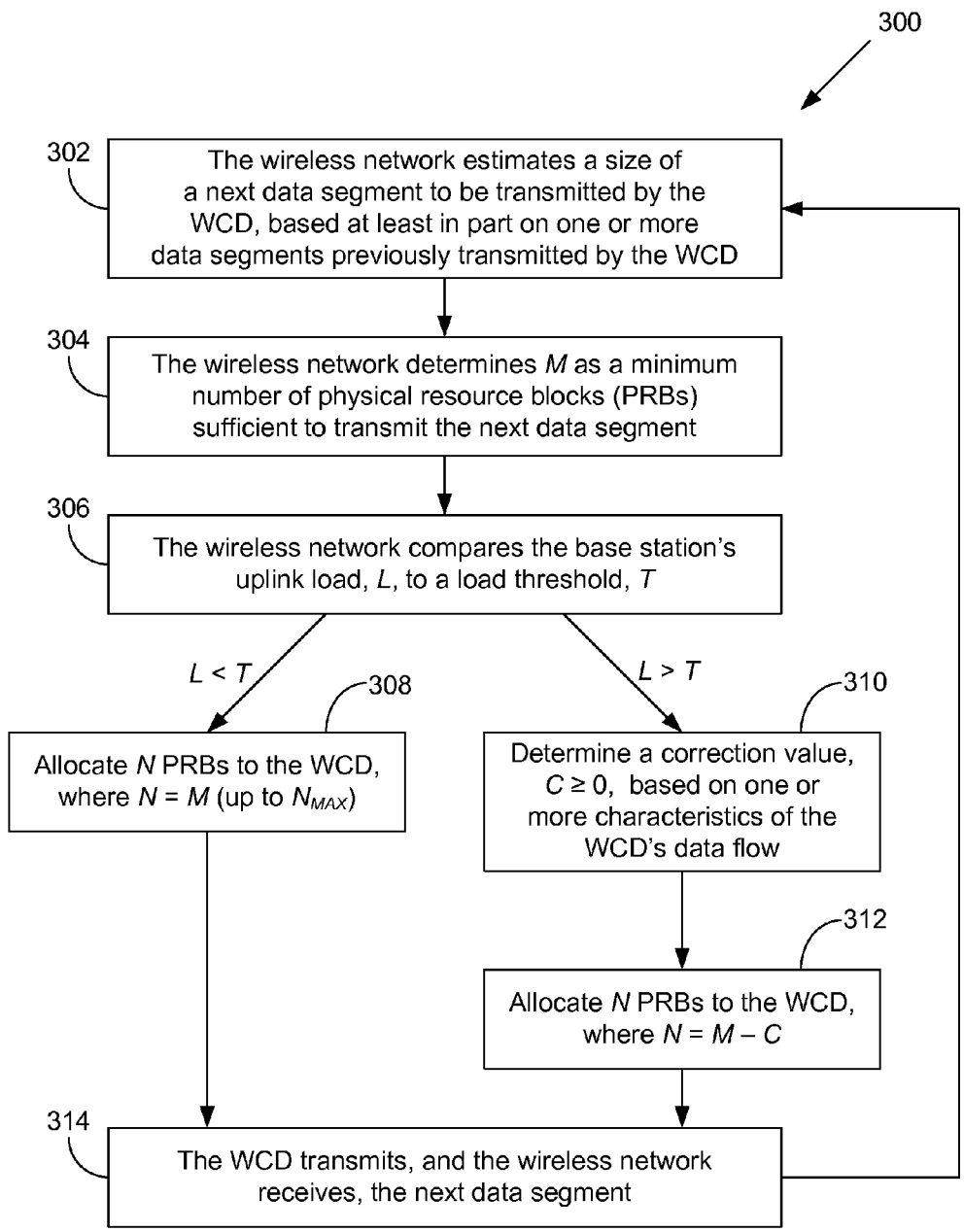
FIG. 5 is a flowchart of a method for allocating a number of physical resource blocks to a WCD, in accordance with an example embodiment.
Figure 6:
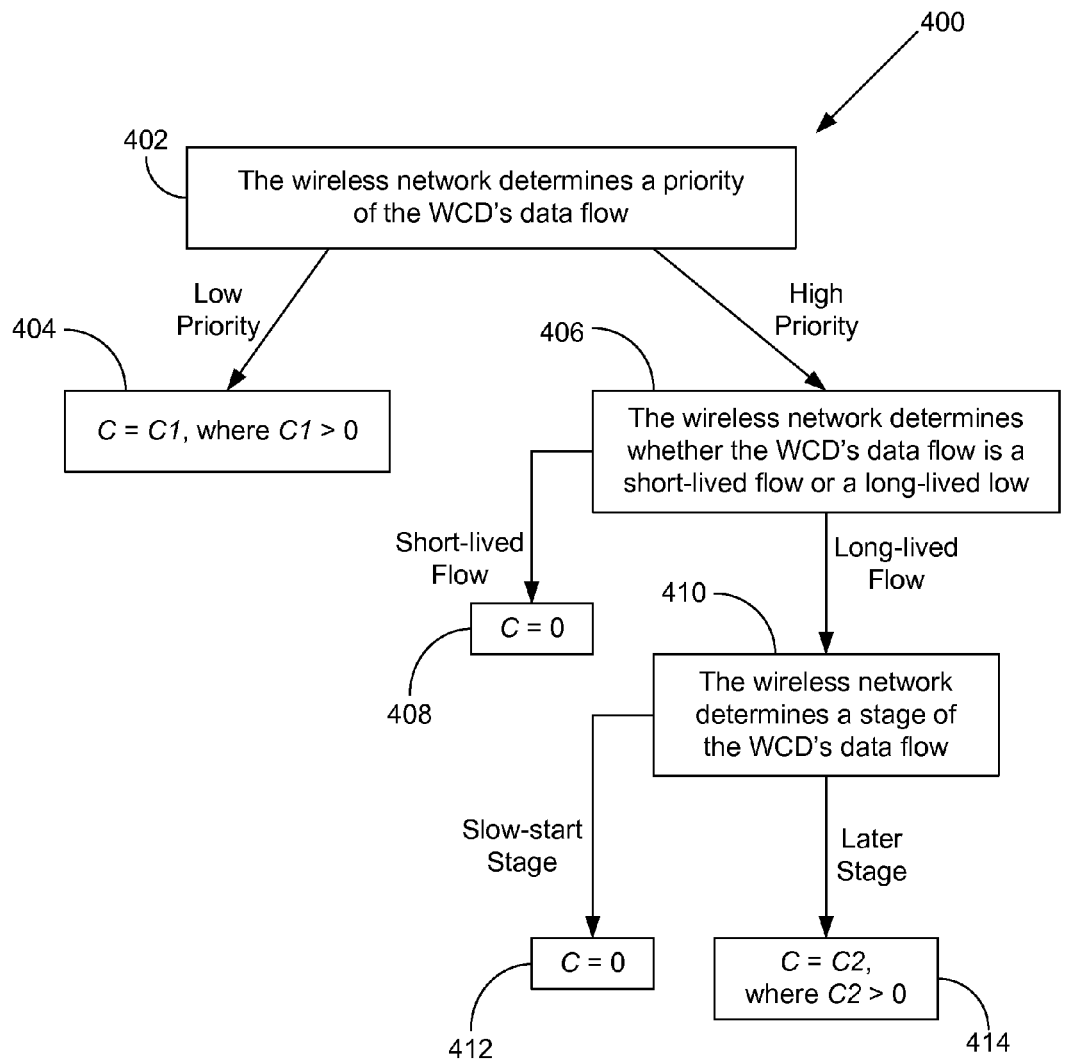
FIG. 6 is a flowchart of a method for determining a correction value, C, in accordance with an example embodiment

FIGS. 4-6 are flow charts illustrating example methods relating to allocation of uplink resources to a WCD. For purposes of illustration, the example methods are described with reference to a communication system as shown in FIG. 1, air interface resources as shown in FIGS. 2A and 2B, and a congestion control algorithm as shown in FIG. 3. It is to be understood, however, that the methods could be applied to other types of communication systems, air interface resources, and/or congestion control algorithms.

FIG. 4 is a flowchart illustrating an example method 200 for allocating a quantity of uplink resources to a WCD in the context of the TTI bundling. It is to be understood, however, that the method could be applied in other contexts. In method 200, the WCD is being served by a base station in a wireless network (e.g., WCD 16 being served by base station 14 in wireless network 12). In addition, the WCD is transmitting data in either a UDP data flow or a TCP data flow. Thus, the base station in the wireless network receives one or more data segments transmitted by the WCD in one or more TTIs, as indicated by block 202. The data segments could be data packets, with each data packet including a respect packet header and data payload.

At this point, the base station determines that TTI bundling is warranted for the WCD, as indicated by block 204. In an example, the base station may determine whether TTI bundling is warranted for the WCD based on at least a power headroom report that is received from the WCD. In LTE, a WCD device may calculate a "power headroom" as a difference between the WCD's transmit power requirement for its uplink resource allocation and the WCD's maximum transmit power. If the power headroom that a WCD reports is positive, indicating that the WCD's transmit power requirement is less than its maximum transmit power, then the base station may conclude that TTI bundling is not warranted for the WCD. If the power headroom that the WCD reports is negative, indicating that the WCD's transmit power requirement is more than its maximum transmit power, then the base station may determine that TTI bundling is warranted for the WCD. Other methods for determining whether TTI bundling is warranted could be used as well.

The base station then instructs the WCD to use TTI bundling to transmit data, as indicated by block 206. By instructing the WCD to use TTI bundling, the base station instructs the WCD to transmit the same data (e.g., the next data segment in the WCD's data flow) in each of a plurality of TTIs. The plurality of TTIs could be a fixed number of consecutive TTIs, for example, four consecutive TTIs. Alternatively, the plurality of TTIs could be a variable number of TTIs. For example, the base station may determine what number of TTIs the WCD should use based on uplink load and/or other considerations and may indicate the number of TTIs when instructing the WCD to use TTI bundling. In some instances, the plurality of TTIs could include non-consecutive TTIs.

As noted above, the WCD could be engaged in either a UDP data flow or a TCP data flow. Further, the procedure used to allocate uplink resources may depend on whether the WCD's data flow uses UDP or TCP. Thus, the wireless network determines the transport protocol used to transmit the one or more data segments, as indicated by block 208. The wireless network may determine the transport protocol by, for example, inspecting the packet headers in the one or more data segments.

If the transport protocol is determined to be UDP, the wireless network uses a default procedure to allocate a quantity of uplink resources to the WCD for the WCD to use in one or more subsequent TTIs, as indicated by block 210. The one or more subsequent TTIs may, for example, correspond to the plurality of TTIs that the WCD will use to transmit the same data (e.g., the next data segment) using TTI bundling. The quantity of uplink resources could be, for example, a particular number of PRBs. The default procedure could be, for example, a procedure that does not consider the size of the data segments being transmitted by the WCD. For instance, the default procedure could follow the conventional approach of allocating up to three PRBs to the WCD.

If the transport protocol is determined to be TCP, the wireless network uses a TCP-specific procedure to allocate a quantity of uplink resources to the WCD for the WCD to use in one or more subsequent TTIs, as indicated by block 212. The one or more subsequent TTIs may, for example, correspond to the plurality of TTIs that the WCD will use to transmit the same data (e.g., the next data segment) using TTI bundling. The quantity of uplink resources could be, for example, a particular number of PRBs. In general, the TCP-specific procedure allocates uplink resources based on an estimated size of the next data segment to be transmitted by the WCD following a TCP-specific congestion control algorithm. An example TCP-specific procedure is described below with reference to FIG. 5.

Once the wireless network has allocated the uplink resources to the WCD, using either the default procedure or the TCP-specific procedure, the base station transmits to the WCD an indication of the quantity of uplink resources allocated to the WCD, as indicated by block 214. The WCD may then use the uplink resources allocated to it to transmit data in each of the TTIs for which the allocation applies (e.g., in each of the TTIs used by the WCD to transmit the same data using TTI bundling).

FIG. 5 is a flowchart illustrating an example method 300 for allocating a quantity of uplink resources to a WCD using an example TCP-specific procedure. In this example, the wireless network estimates a size of a next data segment to be transmitted by the WCD, based at least in part on one or more data segments previously transmitted by the WCD, as indicated by block 302. The one or more previously-transmitted data segments could, for example, include one or more data segments transmitted by the WCD before the WCD begins using TTI bundling (i.e., could correspond to the one or more data segments received at block 202 of FIG. 4). Alternatively or additionally, the one or more previously-transmitted data segments could include one or more data segments transmitted by the WCD using TTI bundling.

To estimate the size of the next data segment based on the one or more previously-transmitted data segments, the wireless network may refer to a TCP-specific congestion control algorithm that specifies how the sizes of successive data segments increase over time and use the algorithm to predict the size of the next data segment based on the sizes of the one or more previously-transmitted data segments. For example, the wireless network may refer to the algorithm illustrated in FIG. 3 and described above.

In an example predictive approach, the wireless network may determine whether the WCD's data flow is in the slow-start stage or the congestion-avoidance phase by comparing the sizes of the one or more previously-transmitted data segments to the slow start threshold size of 32 kilobytes. Thus, if the size of the most-recently transmitted data segment is less than 32 kilobytes, then the WCD is in the slow-start stage and the wireless network may predict the size of the next data segment to be twice the size of the most-recently transmitted data segment. If the size of the most-recently transmitted data segment is greater than or equal to 32 kilobytes but less than 64 kilobytes, then the WCD is in the congestion-avoidance stage and the wireless network may predict the size of the next data segment to be 1 kilobyte greater than the size of the most-recently transmitted data segment. Further, if the size of the most-recently transmitted data segment is 64 kilobytes, then the WCD is in the constant-rate stage and the wireless network may predict the size of the next data segment to be 64 kilobytes. This predictive approach may be summarized as follows:

$S_{i+1}=2S_i$, if $S_i<32$ kilobytes;

$S_{i+1}=S_i+1$ kilobyte, if $S_i \geq 32$ kilobytes and $S_i<64$ kilobytes; and $S_{i+1}=64$ kilobytes, if $S_i \geq 64$ kilobytes, where $S_i$ is the size (in kilobytes) of the most-recently transmitted data segment and $S_{i+1}$ is the predicted size (in kilobytes) of the next data segment. In addition, $S_i$ can be determined based on CW, and CW can be determined by means of packet header inspection.

The wireless network may then determine a quantity, M, as the minimum number of PRBs sufficient to transmit the next data segment, as indicated by block 304. In one approach, the wireless network determines a modulation and coding scheme assigned to the WCD for uplink transmissions and determines a block data rate as the amount of data that the WCD can transmit in a PRB using that modulation and coding scheme. Based on the WCD's block data rate and the estimated size of the next data segment, the wireless network can then determine M as the minimum number of PRBs that the WCD would need to use in order to transmit the next data segment in its entirety.

Once the wireless network has determined M, the wireless network can allocate N PRBs to the WCD, where $N \geq 1$. In example method 300, N is determined based at least in part on M such that $N \leq M$. More particularly, N is determined based on M and also the base station's uplink load. To take the base station's uplink load into consideration, the wireless network may compare the base station's uplink load, L, to a predetermined load threshold, T, as indicated by block 306. The value of L could, for example, correspond to the number of PRBs that have been allocated to WCDs for uplink transmissions, a percentage of the allocable PRBs that have been allocated to WCDs for uplink transmissions, or could be based on some other measure of the base station's uplink load.

If L is less than T, the wireless network allocates N PRBs to the WCD, where N=M, as indicated by block 308. In some examples, the wireless network may set $N_{MAX}$ as the maximum number of PRBs that can be allocated to a WCD using the TCP-specific procedure. Thus, if M>$N_{MAX}$ then the allocation may be limited such that N=$N_{MAX}$.

If L is greater than T, the wireless network determines a correction value, C≥0, based on one or more characteristics of the WCD's data flow, as indicated by block 310. The one or more characteristics of the data flow could include one or more of a priority of the data flow, a duration of the data flow, and a stage of the data flow. The wireless network then allocates N PRBs to the WCD, where N=M−C, as indicated by block 312. Thus, in the case that C>0, the correction value reduces the number of PRBs allocated to the WCD as a result of the base station's uplink load being threshold high. An example method for calculating C is described below with reference to FIG. 6.

It is to be understood that if N=M, the WCD may be able to transmit the next data segment in one TTI. Thus, with the WCD using TTI bundling, the WCD may transmit the next data segment in each of the TTIs of the TTI bundle. On the other hand, if N<M (e.g., as a result of a non-zero correction value, C), the result could be that WCD uses more than one TTI to transmit the next data segment. This, in turn, can make TTI bundling less efficient.

Once the N PRBs have been allocated to the WCD, and the allocation has been indicated to the WCD, the WCD can begin using the allocated PRBs to transmit the next data segment. Thus, the WCD transmits, and the wireless network receives, the next data segment, as indicated by block 314.

At that point, method 300 may loop back to block 302, with the next data segment transmitted in block 314 now being considered as a previously-transmitted data segment. In this way, the wireless network may use the TCP-specific procedure to separately allocate one or more PRBs to the WCD for each successive data segment that the WCD transmits after being instructed to use TTI bundling. Once the WCD stops using TTI bundling (e.g., because of improved RF conditions), the wireless network may use the default procedure instead of the TCP-specific procedure.

FIG. 6 illustrates an example method 400 for calculating the correction value, C. As noted above with reference to FIG. 5, C≥0 and is used to calculate N=M−C when the base station's uplink load is threshold high. It is to be understood, however, that C could be calculated and applied in other situations as well.

In example method 400, the wireless network first determines a priority of the WCD's data flow, as indicated by block 402. In this example, the priority is determined to be either "low" or "high." It is to be understood, however, that a larger number of priority levels could also be defined.

In some cases, the priority of the data flow could be determined based on the quality of service (QoS) of the bearer being used for the data flow. For example, if the bearer is a guaranteed bit rate (GBR) bearer the priority may be deemed "high," whereas if the bearer is a non-GBR bearer the priority may be deemed "low." Alternatively or additionally, the wireless network may determine priority based on the type of data traffic in the WCD's data flow. This may involve an inspection of the WCD's data packets to determine a destination of the data packets or an application between used by the WCD. Some types of data traffic (e.g., server-based communications) may be deemed "high" priority, whereas other types of data traffic (e.g., peer-to-peer communications) may be deemed "low" priority. Other ways of determining a priority of the data flow are possible as well.

If the WCD's data flow is deemed "low" priority, then the wireless network may select C to be equal to C1, where C1>0, as indicated by block 404. C1 could be a standard value that applies to "low" priority traffic. Since C1>0, and N=M−C, this selection of C=C1 results in a reduction (relative to M) of the number of PRBs allocated to the WCD due to the base station's uplink load being high and the WCD's data flow being "low" priority. As a result, TTI bundling may be less efficient, but more of the base station's uplink resources can be made available for "high" priority traffic.

If the WCD's data flow is deemed "high" priority, the wireless network then determines whether the WCD's data flow is a short-lived flow or a long-lived flow, as indicated by block 406. The classification of the data flow as either short-lived or long-lived could be based on the total amount of data to be transmitted during the data flow (e.g., the size of a file being transmitted). If the total amount of data to be transmitted is less than a threshold amount, then the data flow may be classified as a short-lived data flow. If the total amount of data to be transmitted is greater than the threshold amount, then the data flow may be classified a long-lived data flow.

The classification of the data flow as long-lived or short-lived could also be based on the TCP stage of the data flow. For example, if the data flow is in the constant-rate stage or is well into the congestion-avoidance stage, the data flow could be classified as a long-lived data flow. The slow-start stage, however, may not be determinative, as both short-lived and long-lived data flows start in the slow-start stage. Thus, if the WCD's data flow is currently in the slow-start stage, the total amount of data to be transmitted or some other factor could be used to classify the data as short-lived or long-lived.

If the WCD's data flow is a short-lived flow, then C=0, as indicated by block 408. In this way, even though the base station's uplink load is high, there is no reduction (relative to M) of the number of PRBs allocated to the WCD for a short-lived flow. In particular, the base station's resources are more likely to be adversely loaded by long-term flows than short-term flows. Thus, it may be beneficial to apply resource-saving reductions to long-term flows rather than short-term flows.

If the WCD's data flow is a long-lived flow, the wireless network may further determine the stage of the WCD's data flow, as indicated by block 410. Thus, the wireless network may determine whether the WCD is in the slow-start stage, the congestion avoidance stage, or the constant-rate stage. The wireless network may make this determination based on the size of one or more data segments previously transmitted by the WCD, for example, as described above for block 302 of FIG. 5.

If the WCD's data flow is in the slow-start stage, then C=0, as indicated by block 412. In this way, even though the base station's uplink load is high, there is no reduction (relative to M) of the number of PRBs allocated to the WCD when the WCD is still in the slow-start stage. In particular, the sizes of data segments transmitted during the slow-start stage are smaller than in later stages. Thus, it may be beneficial to apply resource-saving reductions data flows that are in later stages rather than in the slow-start stage.

If the WCD's data flow is in a later stage (i.e., either the congestion-avoidance stage or the constant-rate stage), the wireless network selects C to be equal to C2, where C2>0. C2 could be a standard value that applies to "high" priority, long-lived data flows that are in the congestion-avoidance or constant-rate stage. Since C2>0, and N=M−C, this selection of C=C2 results in a reduction (relative to M) of the number of PRBs allocated to the WCD due to the base station's uplink load being high, notwithstanding the WCD's data flow being "high" priority. Since the data flow is long-lived and is in a later stage, the amount of time needed to transmit all of the data in the data flow is already relatively high. As a result, making the transmission time somewhat longer in order to conserve the base station's uplink resources may be acceptable.

By following the TCP-specific procedure described above with reference to FIGS. 5 and 6, a WCD can in many cases be allocated a quantity of uplink resources that is optimal for transmission of the WCD's next data segment (i.e., may be allocated a minimally sufficient number of PRBs to transmit the next data segment). However, the TCP-specific procedure also allows for a sub-optimal allocation of uplink resources (i.e., less than the minimally sufficient number of PRBs) in some cases, in order to conserve uplink resources when the base station's uplink load is threshold high.

Although FIGS. 4-6 are described with regard to uplink transmissions of data by a WCD, it is to be understood that similar methods could be applied to downlink transmissions of data by a base station. In addition, while the TCP-specific procedure for allocating PRBs to the WCD is triggered by a determination that the WCD should use TTI bundling, it is to be understood that the TCP-specific procedure can be applied in other circumstances as well. For example, the TCP-specific procedure could be applied whenever a WCD uses TCP to transmit data.

4. Example Controller

Figure 7:
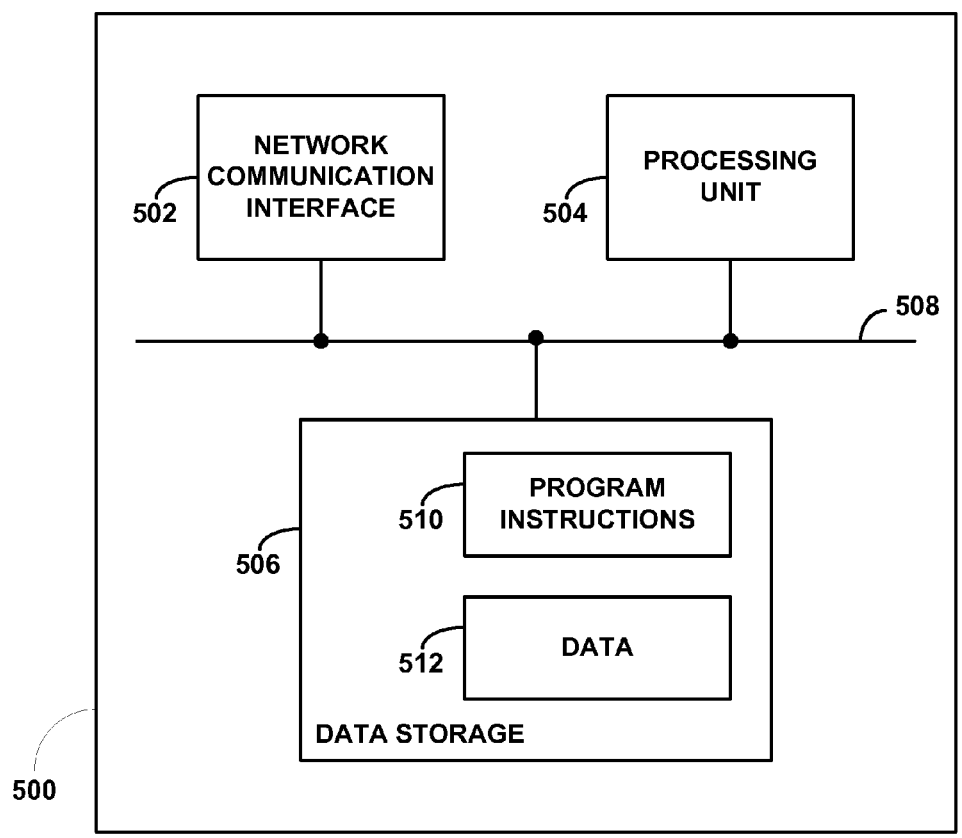
FIG. 7 is a block diagram of a controller of a wireless network, in accordance with an example embodiment.

FIG. 7 is a block diagram of an example controller 500 of a base station in a wireless network. Controller 500 could, for example, correspond to controller 15 in wireless network 12, as shown in FIG. 1. As shown in FIG. 7, controller 500 includes a network communication interface 502, a processing unit 504, and data storage 506, all of which may be communicatively linked together by a system bus, network, or other connection mechanism 508.

Network communication interface 502 supports communication with various other network entities, such as BS 14 or other entities in wireless network 12 shown in FIG. 1. As such, the interface 502 may include one or more network interface modules, such as Ethernet network interface modules, or any other type of wired and/or wireless communication interfaces.

Processing unit 504 may comprise one or more general purpose processors (e.g., microprocessors) and/or one or more special purpose processors (e.g., application specific integrated circuits). Data storage 506 may comprise one or more volatile and/or non-volatile non-transitory storage components, such as optical, magnetic, or flash storage, and may be integrated in whole or in part with processing unit 504.

As shown, data storage 506 may hold program instructions 510 and data 512. Program instructions 510 may be executable by processing unit 504 to carry out various functions described herein. Data 512 could be any data that is generated, received, or used in connection with carrying out such functions.

In one example, program instructions 510 may be executable by one or more processors in processing unit 504 to carry out any of the functions described above with reference to FIGS. 4-6. Thus, the functions may include: (i) receiving, via the base station, one or more data segments transmitted by a WCD in one or more TTIs; (ii) estimating a size of a next data segment to be transmitted by the WCD, based at least in part on sizes of the one or more data segments transmitted by the WCD; (iii) allocating a quantity of uplink resources to the WCD for use by the WCD in or more subsequent TTIs, based at least in part on the estimated size of the next data segment; and (iv) causing the base station to transmit an indication to the WCD of the quantity of uplink resources allocated to the WCD.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
    receiving, by a base station in a wireless network, one or more data segments transmitted by a wireless communication device (WCD) in one or more transmission time intervals (TTIs);
    estimating, by the wireless network, a size of a next data segment to be transmitted by the WCD based at least in part on sizes of the one or more data segments transmitted by the WCD;
    allocating, by the wireless network, a quantity of uplink resources to the WCD for use by the WCD in one or more subsequent TTIs, based at least in part on the estimated size of the next data segment; and
    transmitting, by the base station, an indication to the WCD of the quantity of uplink resources allocated to the WCD.

2. The method of claim 1, further comprising:
    determining, by the base station, that TTI bundling is warranted for the WCD; and
        in response to determining that TTI bundling is warranted for the WCD, transmitting, by the base station, an instruction to the WCD to transmit same data in each of a plurality of TTIs,
    wherein allocating the quantity of uplink resources to the WCD for use by the WCD in the one or more subsequent TTIs comprises allocating the quantity of uplink resources to the WCD for use in each of the plurality of TTIs.

3. The method of claim 2, further comprising:
    in response to determining that TTI bundling is warranted for the WCD, determining, by the wireless network, a transport protocol used for the one or more data segments.

4. The method of claim 3, wherein determining the transport protocol used for the one or more data segments comprises inspecting packet headers of the one or more data segments.

5. The method of claim 3, wherein the transport protocol specifies an algorithm for increasing sizes of successive data segments.

6. The method of claim 5, wherein estimating, by the wireless network, a size of a next data segment to be transmitted by the WCD based at least in part on sizes of the one or more data segments transmitted by the WCD comprises using the algorithm to predict the size of the next data segment based on the sizes of the one or more data segments.

7. The method of claim 5, wherein the transport protocol is Transmission Control Protocol (TCP) and the algorithm is a congestion control algorithm.

8. The method of claim 1, wherein the uplink resources are divided into physical resource blocks (PRBs) and each PRB occupies a predetermined time domain and a predetermined frequency domain.

9. The method of claim 8, wherein allocating, by the wireless network, the quantity of uplink resources to the WCD for use by the WCD in the one or more subsequent TTIs, based at least in part on the estimated size of the next data segment comprises:
　determining a modulation and coding scheme assigned to the WCD;
　determining a block data rate as an amount of data that the WCD can transmit in a PRB using the modulation and coding scheme; and
　determining M as a minimum number of PRBs sufficient to transmit the next data segment based on the estimated size of the next data segment and the block data rate.

10. The method of claim 9, wherein allocating, by the wireless network, the quantity of uplink resources to the WCD for use by the WCD in the one or more subsequent TTIs, based at least in part on the size of the next data segment further comprises:
　determining N based at least in part on M, wherein N≤M; and
　allocating N PRBs to the WCD.

11. The method of claim 10, wherein determining N based at least in part on M comprises:
　determining a load of the base station; and
　comparing the load of the base station to a threshold.

12. The method of claim 11, wherein determining N based at least in part on M further comprises:
　determining that the load of the base station is less than the threshold; and
　in response to the load of the base station being less than the threshold, determining N to be equal to M.

13. The method of claim 10, wherein determining N based at least in part on M further comprises:
　determining that the load of the base station is greater than the threshold; and
　in response to the load of the base station being greater than the threshold, determining a correction value, C, based on one or more characteristics of a data flow comprising the one or more data segments and the next data segment, wherein C≥0; and
　determining N to be equal to M−C.

14. The method of claim 13, wherein the one or more characteristics of the data flow include one or more of a priority of the data flow, a duration of the data flow, and a stage of the data flow.

15. A wireless network, comprising:
　a base station;
　a controller, wherein the controller comprises:
　　one or more processors;
　　data storage; and
　　program instructions stored in the data storage, wherein the program instructions are executable by the one or more processors to cause the controller to perform functions, the functions comprising:
　　　receiving, via the base station, one or more data segments transmitted by a wireless communication device (WCD) in one or more transmission time intervals (TTIs);
　　　estimating a size of a next data segment to be transmitted by the WCD, based at least in part on sizes of the one or more data segments transmitted by the WCD;
　　　allocating a quantity of uplink resources to the WCD for use by the WCD in one or more subsequent TTIs, based at least in part on the estimated size of the next data segment; and
　　　causing the base station to transmit an indication to the WCD of the quantity of uplink resources allocated to the WCD.

16. The wireless network of claim 15, wherein the functions further comprise:
　determining that TTI bundling is warranted for the WCD; and
　in response to determining that TTI bundling is warranted for the WCD, causing the base station to instruct the WCD to transmit same data in each of a plurality of TTIs,
　wherein allocating the quantity of uplink resources to the WCD for use by the WCD in the one or more subsequent TTIs comprises allocating the quantity of uplink resources to the WCD for use in each of the plurality of TTIs.

17. The wireless network of claim 16, wherein the functions further comprise:
　in response to determining that the TTI bundling is warranted for the WCD, determining that the one or more data segments were transmitted using a transport protocol that specifies an algorithm for increasing sizes of successive data segments.

18. The wireless network of claim 17, wherein estimating a size of a next data segment to be transmitted by the WCD based at least in part on sizes of the one or more data segments transmitted by the WCD comprises using the algorithm to predict the size of the next data segment based on the sizes of the one or more data segments.

19. The wireless network of claim 18, wherein the uplink resources are divided into physical resource blocks (PRBs) and each PRB occupies a predetermined time domain and a predetermined frequency domain.

20. The wireless network of claim 19, wherein allocating the quantity of uplink resources to the WCD for use by the WCD in the one or more subsequent TTIs, based at least in part on the estimated size of the next data segment comprises:
　determining a modulation and coding scheme assigned to the WCD;
　determining a block data rate as an amount of data that the WCD can transmit in a PRB using the modulation and coding scheme;
　determining M as a minimum number of PRBs sufficient to transmit the next data segment based on the estimated size of the next data segment and the block data rate;
　determining N based at least in part on M, wherein N≤M; and
　allocating N PRBs to the WCD.

\* \* \* \* \*